(12) United States Patent
Beaulaton et al.

(10) Patent No.: US 10,330,474 B2
(45) Date of Patent: Jun. 25, 2019

(54) QUADRATURE ERROR COMPENSATION CIRCUIT FOR A MEMS GYROSCOPE

(71) Applicant: NXP USA, Inc., Austin, TX (US)

(72) Inventors: Hugues Beaulaton, Toulouse (FR); Philippe Patrick Calmettes, Garidech (FR); Thierry Dominique Yves Cassagnes, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 226 days.

(21) Appl. No.: 15/412,146

(22) Filed: Jan. 23, 2017

(65) Prior Publication Data
US 2017/0328735 A1 Nov. 16, 2017

(30) Foreign Application Priority Data
May 10, 2016 (EP) .................................. 16290078

(51) Int. Cl.
*G01C 19/5726* (2012.01)
(52) U.S. Cl.
CPC ................... *G01C 19/5726* (2013.01)

(58) Field of Classification Search
CPC .................................................. G01C 19/5726
USPC ........................................ 329/349, 358, 360
See application file for complete search history.

(56) References Cited

U.S. PATENT DOCUMENTS

| 4,511,848 | A | 4/1985 | Watson |
| 2006/0213265 | A1 | 9/2006 | Weber et al. |
| 2013/0031950 | A1* | 2/2013 | Donadel ............ G01C 19/5776 73/1.77 |
| 2013/0268228 | A1* | 10/2013 | Opris ..................... G01C 25/00 702/104 |

* cited by examiner

*Primary Examiner* — Joseph Chang
(74) *Attorney, Agent, or Firm* — Charlene R. Jacobsen (57) ABSTRACT

MEMS gyroscopes are often integrated in modern electronic products for measuring orientation or rotation in those products. However, these MEMS gyroscopes are often inaccurate. The invention provides a compensation circuit to compensate for errors causing a distortion of a measured Coriolis force. The compensation circuit demodulates an input signal provided by the MEMS gyroscope to produce a quadrature signal indicative of the quadrature error and provides a compensation signal to the MEMS gyroscope for actively compensating the quadrature error.

20 Claims, 10 Drawing Sheets

QUADRATURE ERROR COMPENSATION CIRCUIT FOR A MEMS GYROSCOPE

FIELD

The invention relates to the field of compensation circuits for compensating a quadrature error in a MEMS gyroscope.

BACKGROUND

Gyroscopes are known instruments which can be used for measuring the Coriolis force or for maintaining orientation. The first gyroscopes included a wheel spinning at high velocity. A typical modern version of the gyroscope includes a vibrating mass implemented as a micromechanical system (MEMS), also known as a MEMS gyroscope.

A vibrating mass has a tendency to continue vibrating in the same plane when its support rotates. The Coriolis effect causes the vibrating mass to exert a force on its rotating support. By measuring this Coriolis force, the rate of rotation of the support may be determined.

The vibrating mass of a MEMS is suspended by resilient members, such as springs. In use, the vibrating mass is brought into oscillation by a drive. The drive is powered by an external source. The external source typically provides an alternating signal, such as a sinus waveform, with a frequency around the oscillation frequency of the suspended vibrating mass.

The MEMS gyroscope provides an output signal which can be used to provide an indication of the Coriolis force. MEMS gyroscopes are typically integrated in electronic products, such as consumer products. MEMS gyroscopes, when integrated in a product, may be used to measure orientation and/or rotation of the product.

MEMS gyroscopes may be provided with a quadrature error compensation circuit to compensate for the so-called quadrature error. This error can be caused by the vibrating direction of the mass not being fully in line with the driving direction, resulting in an undesired vibration component perpendicular to, that is in quadrature with, the driving direction.

A disadvantage of current MEMS gyroscopes is that the accuracy with which they measure the Coriolis force varies over time. In particular, the quadrature error typically increases over time, as a typical quadrature error compensation circuit is incapable of effectively compensating for temperature changes and mechanical stress that may occur during the lifetime of the MEMS gyroscope.

BRIEF DESCRIPTION OF THE DRAWINGS

The invention will be apparent from and elucidated further with reference to the embodiments described by way of example in the following description and with reference to the accompanying drawings, in which FIG. 1 schematically shows an embodiment of a vibratory MEMS gyroscope.

The figures are purely diagrammatic and not drawn to scale. In the figures, elements which correspond to elements already described may have the same reference numerals.

DETAILED DESCRIPTION OF EXEMPLARY EMBODIMENTS

The compensation circuit of the invention actively measures and corrects a quadrature error, which may change over time, by adjusting a DC compensation signal for compensating the quadrature error. A demodulator demodulates an input signal provided by the MEMS gyroscope to provide a quadrature signal indicative of the quadrature error. An adjustment unit uses this quadrature signal to adjust the DC compensation signal such that the quadrature error is reduced. By reducing the quadrature error, the output signal will be indicative of the Coriolis force acting upon the MEMS gyroscope with a higher accuracy.

The MEMS gyroscope is typically a gyroscope with a vibrating mass. A perfect gyroscope will have a mass vibrating along a straight line. When subjected to a rotation, the Coriolis effect causes the vibrating mass to exert a force on its rotating support. Measuring this Coriolis force, for example by using a force sensor, may result in a gyroscope signal indicative of the rotation.

Manufacturing of the MEMS gyroscope may engender imperfections. These imperfections may be, among others, the imperfect shape of the vibrating mass, imperfect shape of the drive of the vibrating mass or imperfect resilient parts suspending the vibrating mass. These imperfections may have an influence on the trajectory of the vibrating mass. The trajectory due to these imperfections may have the shape of an ellipse. The width of the ellipse is double the amplitude of the quadrature error.

It is an insight of the inventors that these imperfections may change over time and may cause a change in the quadrature error. The change of the imperfections may be due to wear and tear. For example, the vibrating mass may have a contact surface with some friction, which causes wear of the contact surface. As another example, the resilience of the resilient parts suspending the vibrating mass may change over time.

It is also an insight of the inventors that other influences may cause a change of the quadrature error. As an example, a MEMS gyroscope may be placed outdoors where the temperature may fluctuate during a day. As another example, a MEMS gyroscope may be subjected to a temperature fluctuation when moved from indoors to outdoors or vice versa. As yet another example, a MEMS gyroscope may be placed in an environment where the gyroscope experiences a compression and/or torsion force. The compression and/or torsion force may change the quadrature error.

The above examples of causes of a change to a quadrature error of a MEMS gyroscope are indicative of the variability of the speed of change of the quadrature error. Tests of the inventors have shown that a change of temperature and/or mechanical stress acting upon the gyroscope may already cause a significant change in the quadrature error.

It is a further insight of the inventors that the change of the quadrature error is the main contributor to the inaccuracy of the measured Coriolis force measured by the MEMS gyroscope. The same tests of the inventor have shown, that the change of quadrature error due to temperature and/or mechanical stress may be in the range of or even several magnitudes larger than the signal from the Coriolis force.

The result of a change of the quadrature error of a MEMS gyroscope is that an output signal provided by the MEMS gyroscope may be distorted and/or may give a false reading of the Coriolis force acting upon the MEMS gyroscope. The quadrature error may even be so large that the amplitude swing of the output signal due to the quadrature error saturates electronic circuitry coupled to the output signal. Thus, the accuracy with which the output signal represents the Coriolis force acting upon the MEMS gyroscope may depend on the change of the quadrature error overtime.

The following figures may detail different embodiments.

Figure 1:
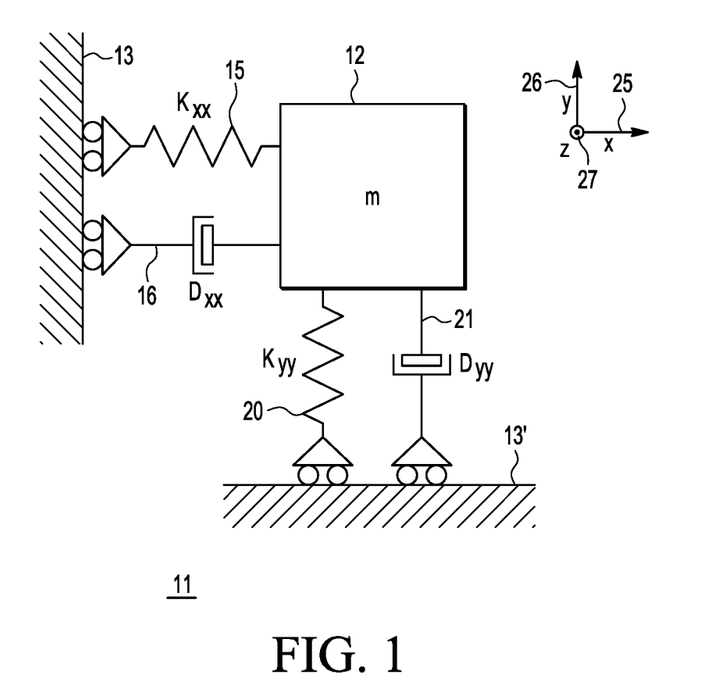

FIG. 1 shows schematically an embodiment of a vibratory MEMS gyroscope 11 at a position relative to a reference 13, 13'. The gyroscope includes a mass 12, which mass may vibrate along a drive trajectory parallel to an X-axis 25. A spring $k_{xx}$ 15 suspends the vibrating mass 12 in the direction of the X-axis relative to the reference 13, while a damper $D_{xx}$ 16 dampens the vibrating mass in the direction of the X-axis relative to the reference 13. The combination of the mass 12, spring 15 and damper 16 is labelled as a drive system. The drive system will typically behave as a second order system with a drive resonance frequency.

The mass of the gyroscope may experience a Coriolis force parallel to a Y-axis 26 when an angular velocity parallel to a Z-axis 27 (perpendicular to the plane of the drawing) is applied to the vibrating mass. Due to the Coriolis force the mass 12 will vibrate along a sense trajectory parallel to the Y-axis 26.

A spring $k_{yy}$ 20 suspends the vibrating mass 12 in the direction of the Y-axis relative to the reference 13'. A damper $D_{yy}$ 21 dampens the vibrating mass in the direction of the Y-axis in view of the reference 13'. The combination of the mass 12, spring 20 and damper 21 is labelled as a sense system. The sense system will typically behave as a second order system with a sense resonance frequency.

For frequencies substantially smaller than the resonance frequency, the phase shift between an input and an output signals of the second order system typically is 0 degrees. For frequencies substantially larger than the resonance frequency, the phase shift typically is −180 degrees. And for the resonance frequency the phase shift typically is −90 degrees.

The mass 12 is typically driven along the drive trajectory at the drive resonance frequency. If the drive resonance frequency and sense resonance frequency match with each other, then the gyroscope is said to use match mode. The phase shift of the sense system is then −90 degrees. If there is a mismatch between the drive resonance frequency and sense resonance frequency, then the gyroscope is said to use mismatch mode. In mismatch mode typically the resonance frequencies are located at such a distance from each other that the phase shift of the sense system is either 0 degrees or −180 degrees, plus or minus a deviation. The deviation should not exceed 10 degrees, preferably 5 degrees, more preferably 2 degree and most preferably 1 degree.

The frequency of oscillation of a mass of a MEMS gyroscope is typically over 10 kHz. The drive signal provided to the gyroscope and the output signal coming from the gyroscope have substantially the same frequency. In the context of this application these signals are referred to as alternating current (AC) signals.

A compensation signal for compensating the quadrature error of the gyroscope may be provided to a quadrature input of the MEMS gyroscope. This compensation signal may be a direct current (DC) signal. This compensation signal may vary slowly over time to compensate a slowly changing quadrature error. Examples of slow variations, which may influence the quadrature error, are variations due to temperature variations or changes of mechanical stress acting upon the gyroscope. These slow variations may have some periodicity. The periodicity has typically a frequency lower than 100 Hz, and more likely lower than 10 Hz. The compensation signal may thus be viewed as a DC compensation signal or quasi DC compensation signal.

Although the signals are defined as AC (alternating current) and DC (direct current) signals, the reader will understand that the signals may respectively also be alternating voltage and direct voltage signals.

Although the figures referred to below show a gyroscope in mismatch mode, the same inventive teaching may be applied to a gyroscope in match mode.

Figure 2A:
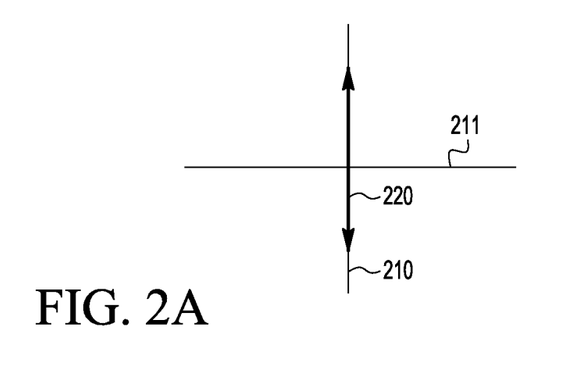
FIGS. 2A, 2B and 2C schematically show the amplitude and direction of a vibrating mass of an embodiment of a MEMS gyroscope.
Figure 2B:
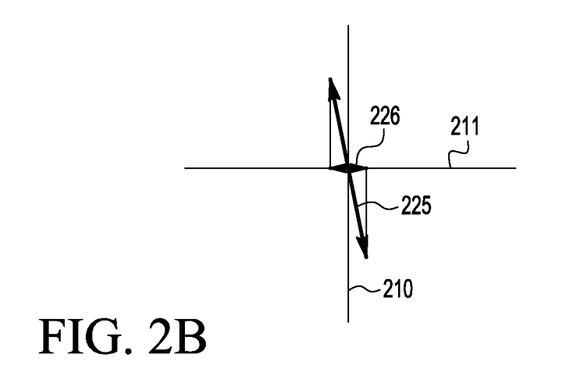
Figure 2C:
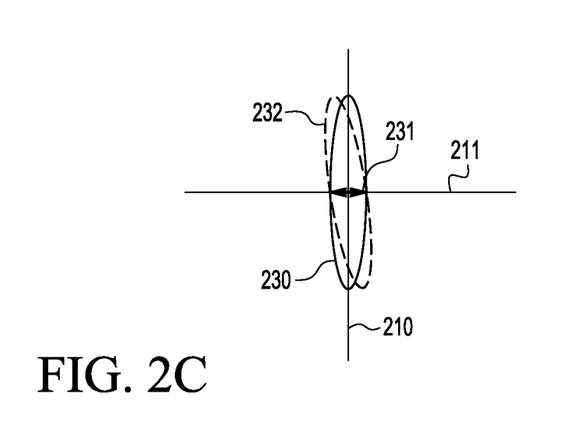

FIGS. 2A, 2B and 2C schematically show the amplitude and direction of a vibrating mass of an embodiment of a MEMS gyroscope. In each of the FIGS. 2A, 2B and 2C a set of axes is shown. The vertical axis 210 represents an axis along which a perfectly balanced mass without a Coriolis force acting upon the mass will vibrate. The horizontal axis 211 shows movements perpendicular to the vertical axis.

In FIG. 2A, the case is shown of a perfectly aligned and balanced gyroscope, experiencing no angular velocity. In this case the mass will vibrate along a first, linear trajectory 220.

In FIG. 2B, the case is shown of a non-perfect gyroscope, experiencing no angular velocity. In this case the mass will vibrate along a second, linear trajectory 225 under an angle with the vertical axis. The projection of the second trajectory on the horizontal axis is defined as a quadrature error 226. The quadrature error is an error signal, which may, when measured, mistakenly be taken as the Coriolis force or may influence the value of the Coriolis force. It is shown in FIG. 2B that the quadrature error is in phase with the position of the mass.

In FIG. 2C, the case is shown of a perfect gyroscope, experiencing an angular velocity. In this case the mass will vibrate along a third elliptical trajectory 230. The amplitude of the elliptical trajectory at the horizontal axis represents the Coriolis force 231. It is shown in FIG. 2C that the Coriolis force is out of phase with the position of the mass.

In practice the gyroscope will be imperfect, which will typically result in a quadrature error. When the gyroscope then experiences an angular velocity, the combination of the Coriolis force and the quadrature error will cause an elliptical trajectory 232 of the mass, at a non-right angle with the vertical axis. This elliptical trajectory 232 is a combination of the first trajectory 220, the quadrature error 226 and the Coriolis force 231 shown in FIG. 2B and FIG. 2C.

Figure 3:
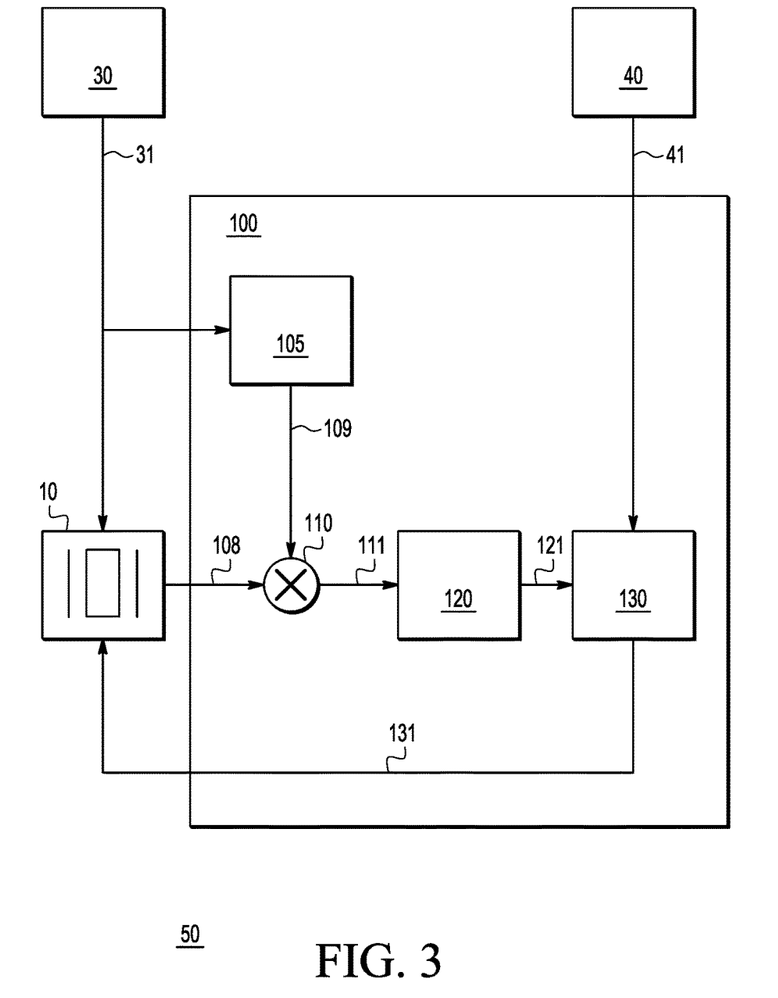
FIG. 3 schematically shows an embodiment of a device according to the invention for measuring a Coriolis force.

FIG. 3 schematically shows an embodiment of a device 50 according to the invention for measuring a Coriolis force. The device includes a MEMS gyroscope 10 and a compensation circuit 100. Optionally the device may include an initial compensation value register 40 and a drive unit 30.

The drive unit provides a drive signal 31 to the MEMS gyroscope. The drive signal 31 drives a mass (12 in FIG. 1) in the gyroscope 10. The mass is driven at the drive frequency, which is typically its drive resonance frequency. The drive signal is typically a sinusoidal signal.

The MEMS gyroscope, when driven and rotating at a certain angular velocity will experience a Coriolis force according to the following formula:

$$\vec{F}_C = -2m\vec{\Omega} \times \vec{v}$$

Wherein:

$\vec{F}_C$=vector representing the Coriolis force
m=mass which is vibrating
$\vec{\Omega}$=vector representing the angular velocity
$\vec{v}$=vector representing the velocity of the mass
x=cross product Due to imperfections of the MEMS gyroscope the linear vibration of the mass may be disturbed, as shown in FIG. 2B. Due to an angular velocity of the gyroscope the mass will vibrate in an elliptical trajectory, as shown in FIG. 2C. An output signal 108 measures the trajectory of the mass.

The embodiment of the compensation circuit 100 shown in FIG. 3 includes a demodulator 110, an adjustment unit 120 and an output unit 130. The compensation circuit may optionally include a Q clock generator 105. The initial compensation value register 40 stores an initial compensation value, which may be a constant value stored during the manufacturing process of the compensation circuit. The compensation value register 40 may be a ROM (Read Only Memory) in which the initial compensation value is permanently stored. During initialization the initial compensation value is provided as initial compensation signal 41 to the output unit 130. In some embodiment, the stored initial compensation value may be updated, for example by writing an updated value into the register 40.

The output unit provides a compensation signal 131 to the gyroscope. The compensation signal is configured for compensating the quadrature error. In an ideal situation the compensation signal reduces the quadrature error to zero. Due to the initial compensation signal 41, the compensation signal 131 will just after initialization be equal to the initial compensation signal 41. It is noted that the compensation signal 131 is a DC compensation signal. Existing compensation circuits show a compensation signal having AC character. To generate the AC compensation signal of the existing compensation circuits a mixer is needed. The invention advantageously provides a DC compensation signal simplifying the compensation circuit and/or leaving out at least a mixer.

During operation the gyroscope 10 provides the output signal 108 to an input of the demodulator 110. The demodulator demodulates using a Q clock signal 109. The Q clock signal is typically approximately a −90 degrees phase-shifted version of the drive signal 31. The Q clock signal may be provided by the drive unit 30 or may be derived from the drive signal 31 by the Q clock generator 105. The Q clock may deviate several degrees from the typical −90 degrees. The demodulator 110 provides a quadrature signal 111 to the adjustment unit. The quadrature signal 111 is indicative of the quadrature error of the MEMS gyroscope.

The quadrature signal 111 may optionally be filtered by a low pass filter for providing a more stable, more DC-like signal. The quadrature signal may optionally be filtered by an anti-aliasing filter for making the signal suitable for digitization by a subsequent analogue to digital convertor. The analogue to digital converter may be a one-bit converter only digitizing the sign of the quadrature signal.

Figure 4:
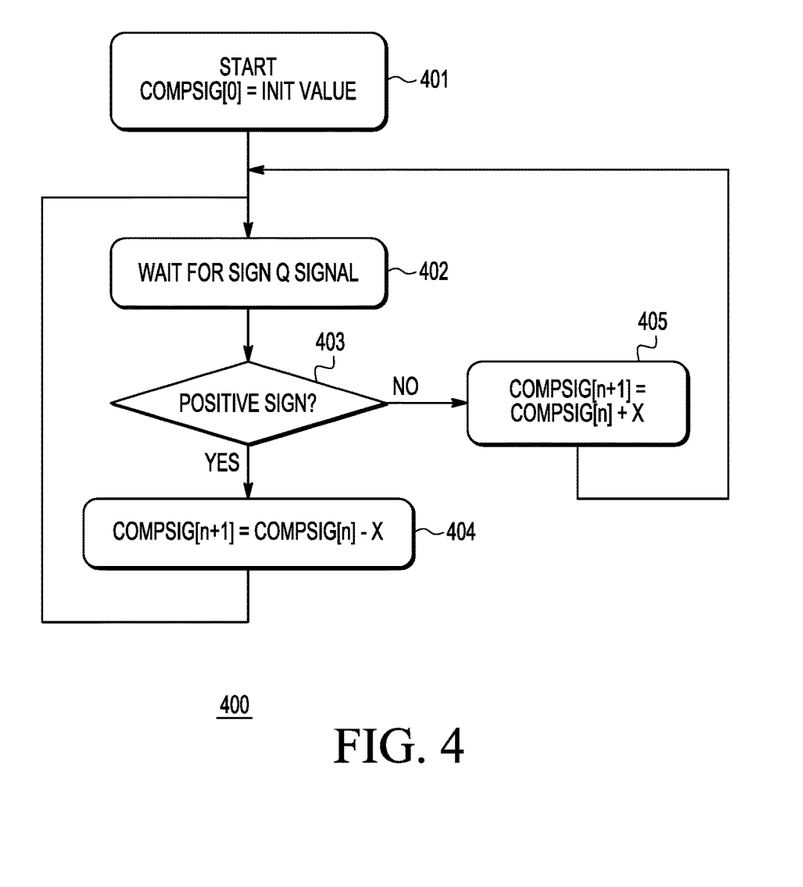
FIG. 4 shows a flow diagram of an algorithm performed by the adjustment unit for calculating the adjusted value according to the invention.

The adjustment unit 120 may process the quadrature signal 111 in analogue or digital form. In the digital form, the quadrature signal may be a one-bit signal. The adjustment unit may include an algorithm to adjust the compensation signal 131. The algorithm may be an algorithm as shown in FIG. 4. The adjustment unit provides 120 an adjusted value 121 to the output unit 130. The output unit will provide the adjusted value as the compensation signal 131 to the gyroscope 10. In an embodiment, the output unit includes a register.

In an embodiment, the output unit 130 is provided with a wired connection, directly coupling the compensation signal 131 to a compensation input of the MEMS gyroscope 10. In the MEMS gyroscope, the compensation signal may be fed to quadrature electrodes which may be adapted to apply an electrostatic force to the vibrating mass.

In an embodiment, the output unit 130 applies the compensation signal 131 to the output signal 108 of the MEMS gyroscope 10.

FIG. 4 shows a flow diagram 400 of an algorithm performed by the adjustment unit 120 for calculating the adjusted value 121 according to the invention. The adjusted value is labelled CompSig in the flow diagram, CompSig being the abbreviation of compensation signal. In an embodiment, the adjusted value is the value of a register in the output unit 130 in FIG. 3. In an embodiment, the adjusted value is a copy of the compensation signal held by a register in the output unit 130 in FIG. 3. In an embodiment, the adjusted value is held by a register in the adjustment unit 120 in FIG. 3.

The flow diagram starts with providing 401 a compensation signal equal to an initial value at a time 0. The initial value is typically the initial compensation signal 41 in FIG. 3. Following providing 401 is waiting 402 for a sign of a quadrature signal 111 in FIG. 3. In this algorithm only the sign of the quadrature signal is used. The sign of the quadrature signal may be positive or negative.

Following waiting 402 is evaluating 403 the sign. If the sign is positive, following evaluating 403 is subtracting 404 an adjustment x from the compensation signal. If the sign is negative, following evaluating 403 is adding 405 the adjustment to the compensation signal. Irrespective of the direction of the adjustment of the compensation signal, the method returns to waiting 402 again for another sign to arrive. From there on the process repeats.

The adjustment value x is typically the same for the addition and the subtraction. In an embodiment two different values x may be selected, one for addition and one for subtraction. In a further embodiment, previous signs of previous values of the quadrature signal may be used to optimize the algorithm, such as increasing or decreasing the adjustment value x. In this further embodiment the increasing or decreasing of the adjustment value x may be seen as a higher order feedback system.

Figure 5:
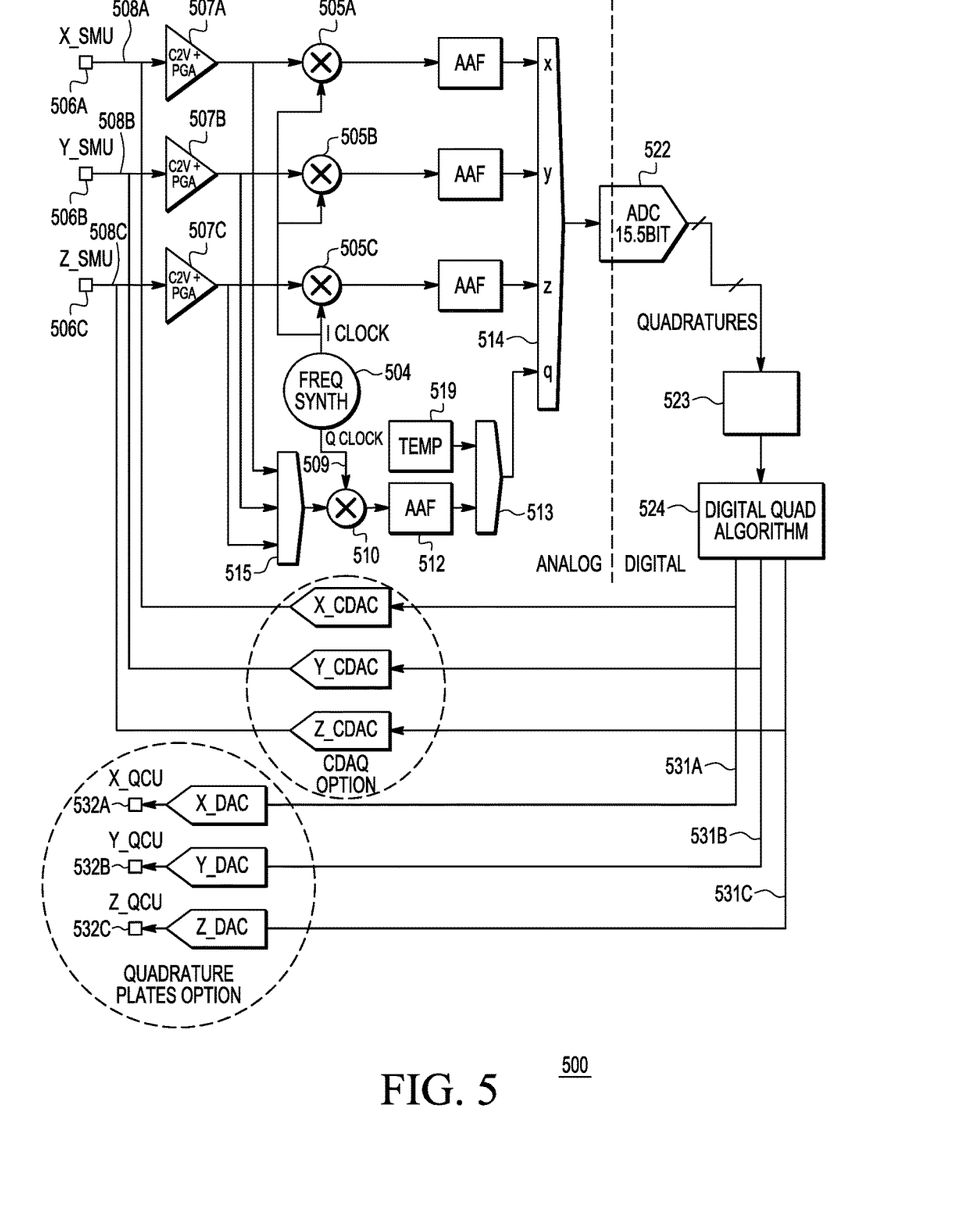
FIG. 5 shows schematically an embodiment of a compensation circuit according to the invention.

FIG. 5 shows schematically an embodiment of a compensation circuit 500 according to the invention. The compensation circuit has three input connectors 506A, 506B and 506C for connecting respectively to three MEMS gyroscopes for measuring the Coriolis force along three axes labelled X, Y and Z. The three input connectors are respectively coupled to an input of three capacitance-to-voltage converters 507A, 507B and 507C. An output of the three capacitance-to-voltage converters is coupled to respective inputs of a first multiplexer 515. The first multiplexer 515 selects one input and provides this signal to an output of the multiplexer. The output of the first multiplexer is coupled to a demodulator 510. The demodulator runs on a quadrature clock 509 synthesized by a frequency synthesizer 504. The quadrature clock is synchronized to a frequency and may differ in phase of a quadrature error of the respective MEMS gyroscopes.

Typically, the respective MEMS gyroscopes are driven at a frequency and a phase, which is equal for all MEMS gyroscopes. Thereby the quadrature errors of the respective MEMS gyroscopes have the same frequency and phase, but may differ in amplitude. Thus, typically, the quadrature clock will be the same for all output signals provided by the MEMS gyroscopes.

An output of the first demodulator 510 is provided to an input of an anti-aliasing filter 512. An output of the anti-aliasing filter 512 is provided to an input of a second multiplexer 513. The output of a temperature sensor unit 519 is also fed to the second multiplexer 513. The second multiplexer 513 selects one of the inputs to be passed on to its output.

The output of the second multiplexer 513 is coupled to an input of a third multiplexer 514. The third multiplexer has three more inputs for respective signals of the three respective gyroscopes made suitable for digitization. Signals may be made suitable for digitization by an anti-aliasing filter. The third multiplexer selects one of the inputs to be passed on to an output of the third multiplexer. The output of the third multiplexer is coupled to an input of an analogue to digital converter 522. The analogue to digital converter may have a 16 bit output. The output of the analogue to digital converter is coupled to an input of a decimator 523 for decimating the output of the analogue to digital converter.

An output of the decimator is coupled to a processor 524. The processor may perform a method for adjusting one of three DC compensation values 531A, 531B and 531C. The processor may perform the method of the algorithm shown in FIG. 4. The respective compensation values are for the respective MEMS gyroscopes to reduce the quadrature error. By reducing the quadrature error the accuracy variation of the Coriolis force measurement is reduced.

Figure 6:
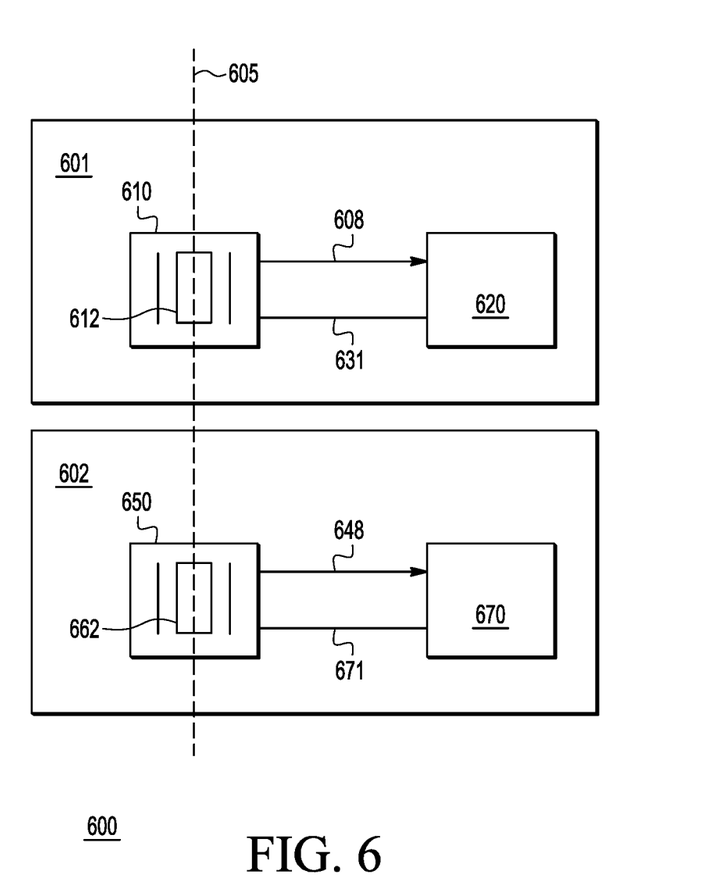
FIG. 6 shows an embodiment of a system including a first device and a second device for measuring a Coriolis forces according to the invention.

FIG. 6 shows an embodiment of a system 600 according to the invention. The system includes a first device 601 for measuring a first Coriolis force and a second device 602 for measuring a second Coriolis force.

The first device 601 includes a first MEMS gyroscope 610 and a first compensation circuit 620. The first MEMS gyroscope 610 provides an output coupled to an input of the first compensation circuit 620 for conveying a signal 608 indicative of the Coriolis force. The first compensation circuit 620 provides a first compensation signal 631 to the MEMS gyroscope for reducing the quadrature error. The MEMS gyroscope includes a first mass substantially vibrating along an axis 605.

The second device 602 includes a second MEMS gyroscope 650 and a second compensation circuit 670. The second MEMS gyroscope 650 includes an output coupled to an input of the second compensation circuit for conveying a signal 648 indicative of the Coriolis force. The second compensation circuit 670 provides a second compensation signal 671 to the MEMS gyroscope for reducing the quadrature error. The MEMS gyroscope includes a second mass substantially vibrating along the axis 605.

The first and the second masses may, in addition to substantially vibrating along the axis 605, also vibrate with a 180 degrees phase difference. That is, the first and second mass move in opposite directions. The arrangement of the first and second device has the effect that the momentum of the first and second mass substantially cancel each other out. This provides the advantage that the system is mechanically more stable.

Figure 7:
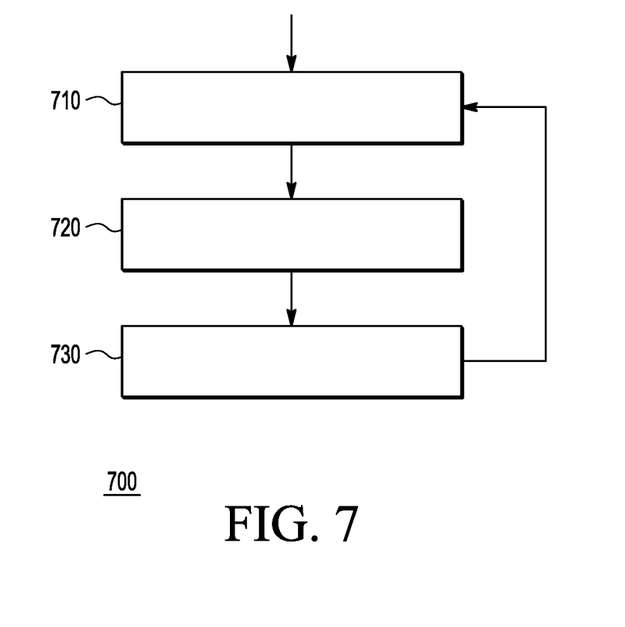
FIG. 7 shows a flow diagram of a method for compensating a quadrature error of a MEMS gyroscope according to the invention.

FIG. 7 shows a flow diagram 700 of a method for compensating a quadrature error of a MEMS gyroscope according to the invention. The method starts with providing a DC compensation signal to the MEMS gyroscope (710). The method continues with demodulating an input signal provided by the MEMS gyroscope (720). The input signal may be indicative of a Coriolis force acting upon the MEMS gyroscope. The method further adjusts the DC compensation signal (730). The adjustment may be done to reduce the quadrature error. The method then continues with providing a DC compensation signal to the MEMS gyroscope (740), whereafter the method continues in a loop with providing or outputting as described above.

Figure 8:
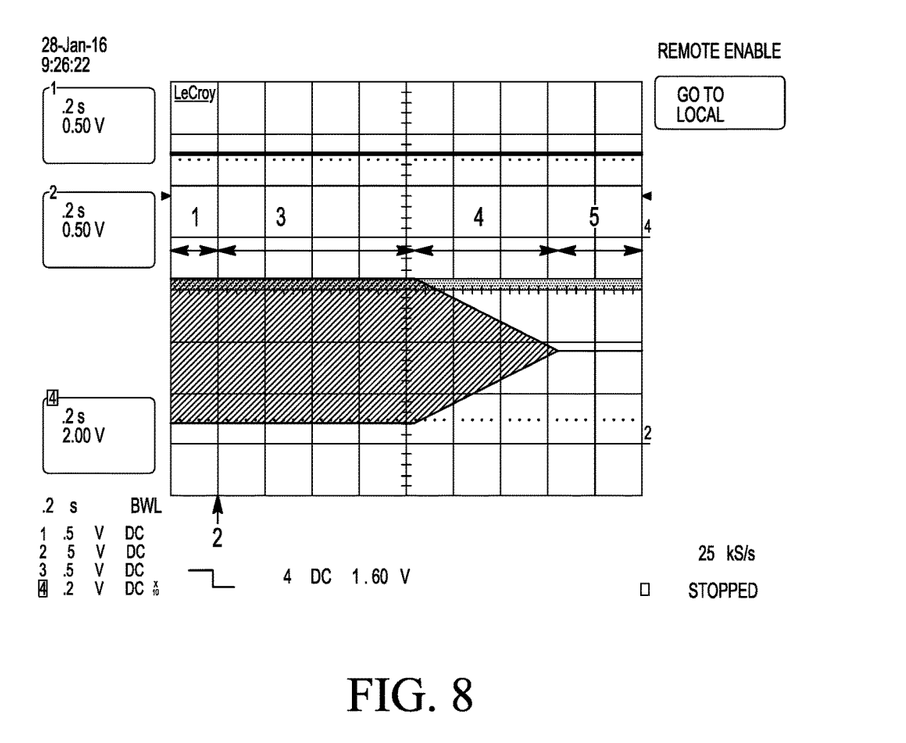
FIG. 8 shows a test result of an embodiment of a compensation circuit coupled to a MEMS gyroscope according to the invention.

FIG. 8 shows a test result of an embodiment of a compensation circuit coupled to a MEMS gyroscope according to the invention. In a first time period 1 the algorithm is not operational and a DC compensation signal is constant. An output signal provided by the gyroscope, present in this time period, is saturated by a quadrature signal from the gyroscope. Hence the quadrature error is large relative to the Coriolis force.

At a point in time 2 the algorithm is activated. After this point in time the DC compensation signal is adjusted according to the algorithm as presented in FIG. 4.

In a second time period 3, although the DC compensation signal is adjusted, the size of the quadrature error is such that the output signal is still saturated by the quadrature signal. In a third time period 4 the quadrature signal does not saturate the output signal anymore and the amplitude of the output signal decreases. The steepness of the slope is determined by the size of the adjustment and the sample frequency of the algorithm. Typically, the sample frequency multiplied by a positive integer equals the drive frequency.

In a fourth time period 5 the DC compensation signal is reduced such that the output signal is suitable for measurement of the Coriolis force with a substantially constant accuracy.

The test shows that a Coriolis force may not be measurable if the quadrature error saturates the output signal. Furthermore, the test shows that a quadrature error may be effectively compensated for with an activated compensation circuit. The effect of the active compensation circuit may be to provide an output signal indicative of a Coriolis force acting upon the MEMS gyroscope with constant and/or stable accuracy.

Figure 9A:
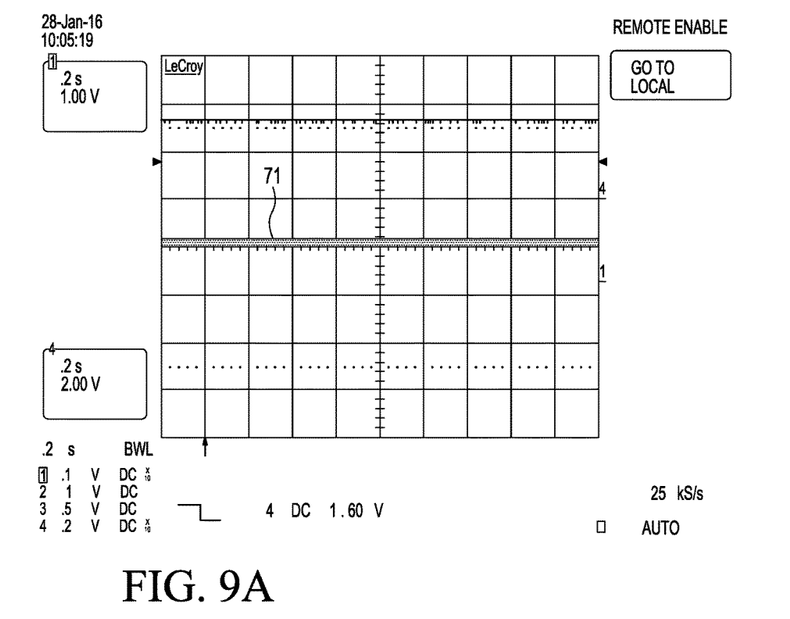
FIGS. 9A and 9B show a test result of an embodiment of a compensation circuit coupled to a MEMS gyroscope according to the invention.
Figure 9B:
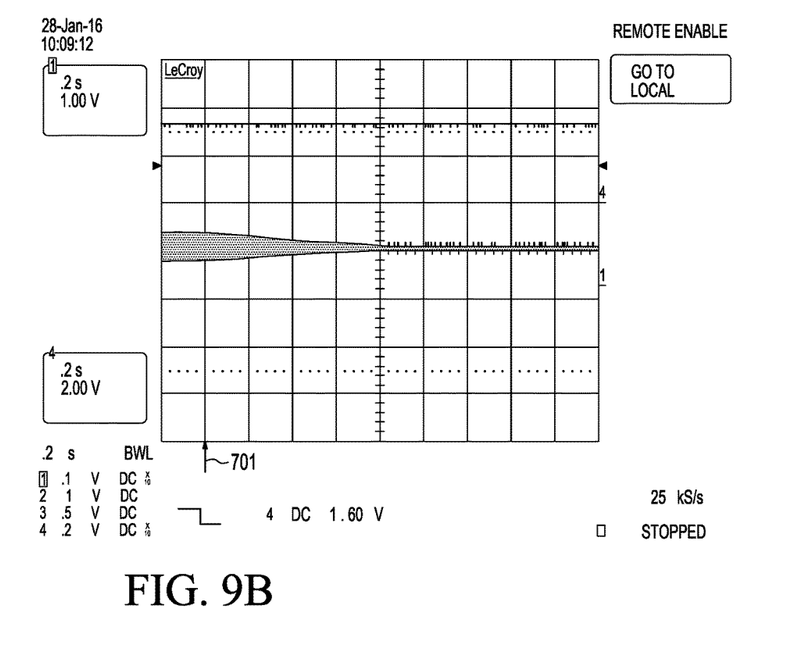

FIGS. 9A and 9B show a test result of an embodiment of a compensation circuit coupled to a MEMS gyroscope according to the invention. FIG. 9A shows an output signal 71 provided by the MEMS gyroscope before starting the test. The output signal is relatively stable. FIG. 9B shows the output signal over time. Before a first point in time 701 a torsion force is applied to the MEMS gyroscope.

At the first point in time 701 the algorithm is activated. As the output signal is not saturated, as was the case for the test shown in FIG. 8, the amplitude of the output signal starts to decrease directly after the algorithm is activated.

After a certain time, wherein the amplitude of the output signal decreases, the amplitude of the output signal stabilizes. After stabilization the quadrature error is not further reduced.

Although for the test in FIGS. 9A and 9B the torsion is varied, causing a variation in the quadrature error, tests have been performed for varying temperatures and for the influence of wear and tear over time for causing a variation in the quadrature error. Comparable test results have been found for these other causes compared to the tests wherein the torsion was varied.

Figure 10:
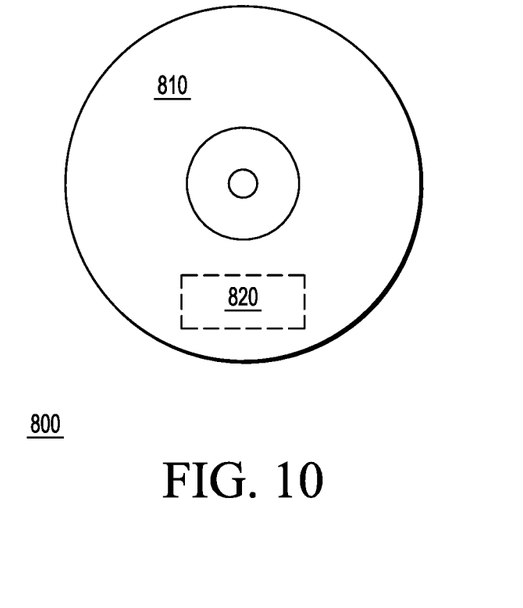
FIG. 10 schematically shows an embodiment of a computer program product, computer readable medium and/or non-transitory computer readable storage medium according to the invention.

FIG. 10 schematically shows an embodiment of a computer program product, computer readable medium and/or non-transitory computer readable storage medium 800 having a writable part 810 including a computer program 820, the computer program including instructions for causing a processor system to perform a method according to the invention.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' or 'including' does not exclude the presence of other elements or steps than those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A compensation circuit for a MEMS gyroscope configured to produce a gyroscope signal indicative of a rotation, the compensation circuit comprising:
a demodulator adapted to demodulate the gyroscope signal by using a clock signal to produce a quadrature signal indicative of a quadrature error of the MEMS gyroscope;
an adjustment unit adapted to adjust a DC compensation signal in dependence of the quadrature signal to produce an adjusted DC compensation signal, wherein the adjustment unit is configured to determine a sign of the quadrature signal, the sign being a positive sign or a negative sign, subtract an adjustment value from the DC compensation signal to produce the adjusted DC compensation signal when the quadrature signal is the positive sign, and add the adjustment value to the DC compensation signal to produce the adjusted DC compensation signal when the quadrature signal is the negative sign; and
an output unit adapted to output the adjusted DC compensation signal to the MEMS gyroscope to compensate for the quadrature error.

2. The compensation circuit according to claim 1, wherein the clock signal is synchronous with a drive signal driving the MEMS gyroscope.

3. The compensation circuit according to claim 2, wherein the clock signal has a phase, which is substantially 0 degrees −90 degrees or −180 degrees shifted relative to a phase of the drive signal.

4. The compensation circuit according to claim 1, wherein the demodulator is an amplitude demodulator.

5. The compensation circuit according to claim 1, wherein the adjustment unit comprises a low pass filter adapted to filter the quadrature signal.

6. The compensation circuit according to claim 1, adapted to set the DC compensation signal to a predetermined value during initialization of the compensation circuit.

7. The compensation circuit according to claim 1, wherein the adjustment unit utilizes only the sign of the quadrature signal to determine whether the adjustment value is to be subtracted from or added to the DC compensation signal to produce the adjusted DC compensation signal.

8. The compensation circuit according to claim 1, wherein the adjustment unit comprises a digitizing unit adapted to digitize the DC compensation signal.

9. The compensation circuit according to claim 1, further comprising a multiplexer adapted to couple multiple MEMS gyroscopes with the compensation circuit adapted to reduce respective quadrature errors.

10. The compensation circuit according to claim 1, further comprising a demultiplexer adapted to provide multiple DC compensation signals to multiple MEMS gyroscopes adapted to reduce respective quadrature errors.

11. A system adapted to measure a Coriolis force comprising:
a first device adapted to measure a first Coriolis force comprising
a first MEMS gyroscope comprising a first mass adapted to vibrate along a first trajectory, the first MEMS gyroscope being configured to produce a first Coriolis signal indicative of the Coriolis force, wherein the first Coriolis signal comprises a quadrature error;
a first compensation circuit comprising:
a first demodulator adapted to demodulate the first Coriolis signal by using a first clock signal to produce a first quadrature signal indicative of a first quadrature error;
a first adjustment unit adapted to adjust a first DC compensation signal in dependence of the first quadrature signal to produce an adjusted first DC compensation signal, wherein the first adjustment unit is configured to determine a sign of the first quadrature signal, the sign being a positive sign or a negative sign, subtract an adjustment value from the first DC compensation signal to produce the adjusted first DC compensation signal when the first quadrature signal is the positive sign, and add the adjustment value to the first DC compensation signal to produce the adjusted first DC compensation signal when the first quadrature signal is the negative sign; and a first output unit adapted to output the adjusted first DC compensation signal to the first MEMS gyroscope to compensate for the first quadrature error.

12. The system according to claim 11, wherein the first clock signal is synchronous with a first drive signal driving the first MEMS gyroscope.

13. The system according to claim 12, wherein the first clock signal has a phase, which is substantially 0 degrees −90 degrees or −180 degrees shifted relative to a phase of the first drive signal.

14. The system according to claim 11, wherein the first demodulator is an amplitude demodulator.

15. The system according to claim 11, wherein the first adjustment unit comprises a low pass filter adapted to filter the first quadrature signal.

16. The system according to claim 11, adapted to set the first DC compensation signal to a predetermined value during initialization of the system.

17. The system according to claim 11, adapted to measure a second Coriolis force comprising:

a second MEMS gyroscope comprising a second mass adapted to vibrate along a second trajectory, the second MEMS gyroscope being configured to produce a second Coriolis signal indicative of the Coriolis force, which second Coriolis signal may contain a quadrature error;

a second compensation circuit comprising:
a second demodulator adapted to demodulate the second Coriolis signal by using a second clock signal to produce a second quadrature signal indicative of a second quadrature error;

a second adjustment unit adapted to adjust a second DC compensation signal in dependence of the second quadrature signal to produce an adjusted second DC compensation signal, wherein the second adjustment unit is configured to determine the sign of the second quadrature signal, subtract the adjustment value from the second DC compensation signal to produce the adjusted second DC compensation signal when the second quadrature signal is the positive sign, and add the adjustment value to the second DC compensation signal to produce the adjusted second DC compensation signal when the second quadrature signal is the negative sign; and a second output unit adapted to output the adjusted second DC compensation signal to the second MEMS gyroscope to compensate for the second quadrature error;

wherein the first and second trajectories are substantially on a same axis; and wherein the first and second mass are adapted to vibrate with a 180 degrees phase difference.

18. A method for compensating a quadrature error of a MEMS gyroscope, the method comprising:

demodulating an input signal provided by the MEMS gyroscope by using a clock signal to produce a quadrature signal indicative of a quadrature error;

adjusting a DC compensation signal in dependence of the quadrature signal to produce an adjusted DC compensation signal, the adjusting operation comprising:
determining the sign of the quadrature signal;
subtracting the adjustment value from the DC compensation signal to produce the adjusted DC compensation signal when the quadrature signal is the positive sign; and
adding the adjustment value to the DC compensation signal to produce the adjusted DC compensation signal when the quadrature signal is the negative sign; and providing the adjusted DC compensation signal to the MEMS gyroscope to compensate for a quadrature error of the MEMS gyroscope.

19. A method according to claim 18, wherein the clock signal is synchronous with a drive signal driving the MEMS gyroscope.

20. The method according to claim 18, wherein the subtracting and adding operations only utilize the sign of the quadrature signal to determine whether the adjustment value is to be subtracted from or added to the DC compensation signal to produce the adjusted DC compensation signal.

* * * * *